United States Patent
Nowara (10) Patent No.: US 7,558,327 B2
(45) Date of Patent: Jul. 7, 2009

(54) PATTERN POSITION MEASURING DEVICE, METHOD, AND PROGRAM, AND RECORD MEDIUM ON WHICH THE PROGRAM IS RECORDED

(75) Inventor: Kenji Nowara, Saitama (JP)

(73) Assignee: Advantest Corporation, Tokyo (JP)

( * ) Notice: Subject to any disclaimer, the term of this patent is extended or adjusted under 35 U.S.C. 154(b) by 676 days.

(21) Appl. No.: 10/512,821

(22) PCT Filed: Apr. 18, 2003

(86) PCT No.: PCT/JP03/04994
§ 371 (c)(1),
(2), (4) Date: Jul. 29, 2005

(87) PCT Pub. No.: WO03/094399
PCT Pub. Date: Nov. 13, 2003

(65) Prior Publication Data
US 2006/0039485 A1    Feb. 23, 2006

(30) Foreign Application Priority Data
Apr. 30, 2002    (JP)    ............................ 2002-128151

(51) Int. Cl.
*H04K 1/10*    (2006.01)
*H04L 27/28*    (2006.01)

(52) U.S. Cl. .......................... 375/260; 455/59; 370/464; 370/480; 370/481; 370/482; 370/491

(58) Field of Classification Search ................. 375/260, 375/354, 316, 368; 327/141, 162, 163; 358/409; 370/503, 509, 512, 513, 514; 713/400, 401; 714/12
See application file for complete search history.

(56) References Cited

U.S. PATENT DOCUMENTS

| | | | |
|---|---|---|---|
| 5,694,389 A | 12/1997 | Seki et al. | |
| 5,761,190 A | 6/1998 | Yamauchi et al. | |
| 5,852,630 A * | 12/1998 | Langberg et al. | ............ 375/219 |
| 6,088,411 A | 7/2000 | Powierski et al. | |
| 6,134,267 A | 10/2000 | Schafer et al. | |
| 6,148,045 A * | 11/2000 | Taura et al. | ................. 375/344 |
| 6,438,173 B1 | 8/2002 | Stantchev | |

(Continued)

FOREIGN PATENT DOCUMENTS

EP    1139623    9/2001

(Continued)

*Primary Examiner*—Shuwang Liu
*Assistant Examiner*—Gina McKie
(74) *Attorney, Agent, or Firm*—Young & Thompson (57) ABSTRACT

The position of a specific pattern such as a known symbol in a signal such as an OFDM signal is estimated with high accuracy. An effective symbol extraction section extracts a known symbol (preamble) as an effective symbol from a signal to be measured according to an approximate position of the known symbol. A mixer determines the product of the frequency spectrum of the extracted effective symbol by the result of the conversion performed by a complex conjugate conversion section from the frequency spectrum of the known symbol into the conjugate complex. A phase shift amount measuring section measures the phase shift amount $\Delta\theta$ of the product determined by the mixer. A precision pattern position measuring section measures the difference between the position of the known symbol and its approximate position on the basis of the phase shift amount.

4 Claims, 4 Drawing Sheets

U.S. PATENT DOCUMENTS

| | | | |
|---|---|---|---|
| 6,539,065 B1 * | 3/2003 | Furukawa | 375/316 |
| 6,993,094 B1 * | 1/2006 | Eberlein et al. | 375/326 |
| 7,106,821 B2 * | 9/2006 | Usui et al. | 375/368 |
| 2008/0107200 A1 * | 5/2008 | Zhu et al. | 375/260 |

FOREIGN PATENT DOCUMENTS

| | | |
|---|---|---|
| JP | 08-228188 A | 9/1996 |
| JP | 11-154919 A | 9/1996 |
| JP | 10-070517 | 3/1998 |
| JP | 10-070517 A | 3/1998 |
| JP | 10-164161 A | 6/1998 |
| JP | 11-154919 A | 8/1999 |
| JP | 08-237219 A | 8/2000 |
| JP | 2000-236322 | 8/2000 |
| JP | 2000-236322 A | 8/2000 |
| JP | 2001-268042 | 9/2001 |
| JP | 2001-513599 A | 9/2001 |

* cited by examiner

PATTERN POSITION MEASURING DEVICE, METHOD, AND PROGRAM, AND RECORD MEDIUM ON WHICH THE PROGRAM IS RECORDED

CROSS-REFERENCE TO RELATED APPLICATIONS

The present Application is based on International Application No. PCT/JP03/04994, filed on Apr. 18, 2003, entitled "PATTERN POSITION MEASURING DEVICE, METHOD, AND PROGRAM, AND RECORD MEDIUM ON WHICH THE PROGRAM IS RECORDED", which in turn corresponds to JP 2002-128151 filed on Apr. 30, 2002, and priority is hereby claimed under 35 USC §119 based on these applications. Each of these applications are hereby incorporated by reference in their entirety into this application.

TECHNICAL FIELD

The present invention relates to estimation of the position of a specific pattern in a signal.

BACKGROUND ART

For demodulating an OFDM (Orthogonal Frequency Division Multiplex) signal typified by MMAC (Multimedia Mobile Access Communication), it is first necessary to determine the position of a known symbol (preamble) contained in a received signal. It should be noted that the known symbol is a symbol added intending synchronization, estimation of a channel position, and the like.

There is a method which uses correlation to determine the position of the known symbol in the received signal. The method is described below. First, the FFT (Fast Fourier Transform) is applied to the received signal. The FFT is applied to the known symbol, and then, the resulting symbol is converted to the conjugate complex. Then, there is determined a product of a result of the application of the FFT to the received signal and a result of the conversion to the conjugate complex of the result of the application of the FFT to the known symbol. The inverse FFT (IFFT) is applied to the product to determine a correlation. This correlation is a function of time, and time at which the correlation takes the maximum value is estimated as the position of the known symbol.

However, it is necessary for fast Fourier transform to digitally represent the signal. Thus, the position of the known symbol cannot be estimated more precisely than a sampling interval used for converting the analog signal to the digital signal.

An object of the present invention is to highly precisely estimate the position of a specific pattern such as the known symbol in a signal such as the OFDM signal.

SUMMARY OF THE INVENTION

According to the present invention, a pattern position measuring device that measures a position of a predetermined pattern in a signal to be measured, including a pattern extraction element that extracts the predetermined pattern as an effective pattern from the signal to be measured based on an approximate position of the predetermined pattern; a spectrum product determining element that determines a product of a frequency spectrum of the effective pattern and data based on a frequency spectrum of the predetermined pattern; a phase shift amount measuring element that measures a phase shift amount of the product determined by the spectrum product determining element; and a precision pattern position measuring element that measures a difference between the position of the predetermined pattern and the approximate position of the predetermined pattern based on the phase shift amount.

The pattern position measuring device constituted as described above measures the position of the predetermined pattern in the signal to be measured. The pattern extraction element extracts the predetermined pattern as the effective pattern from the signal to be measured based on the approximate position of the predetermined pattern. The spectrum product determining element determines the product of the frequency spectrum of the effective pattern and the data based on the frequency spectrum of the predetermined pattern. The phase shift amount measuring element measures the phase shift amount of the product determined by the spectrum product determining element. The precision pattern position measuring element measures the difference between the position of the predetermined pattern and the approximate position of the predetermined pattern based on the phase shift amount.

The phase shift amount itself precisely indicates the position of the predetermined pattern in the signal to be measured, and the position of the predetermined pattern is thus precisely measured.

BEST MODE FOR CARRYING OUT THE INVENTION

A description will now be given of an embodiment of the present invention with reference to drawings.

Figure 1:
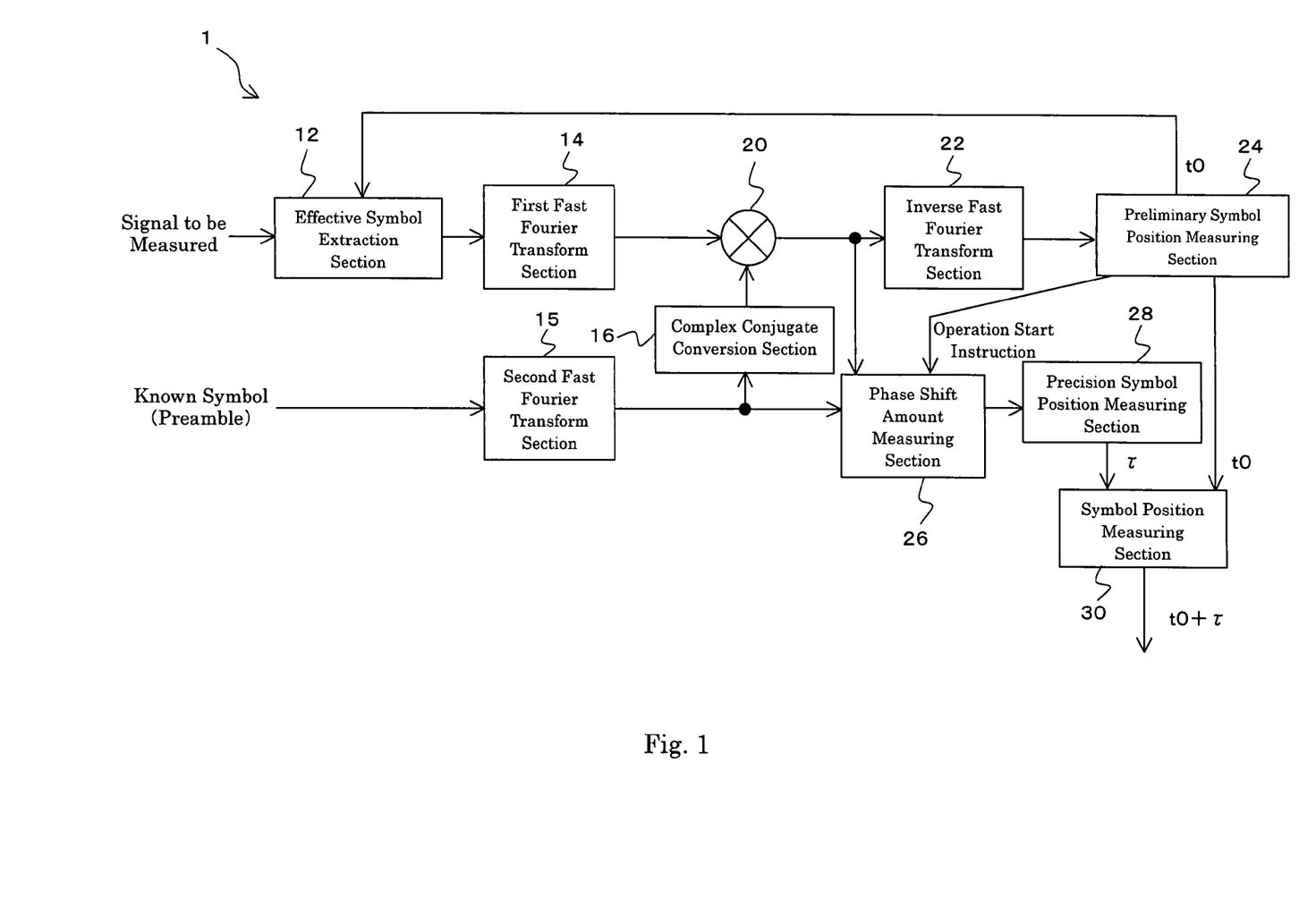
FIG. 1 is a block diagram showing the constitution of a pattern position measuring device 1 according to an embodiment of the present invention.

FIG. 1 is a block diagram showing the constitution of a pattern position measuring device 1 according to the embodiment of the present invention. The pattern position measuring device 1 measures the position of a predetermined pattern in a signal to be measured. It should be noted that it is assumed that the signal to be measured is an OFDM signal and the predetermined pattern is a known symbol (preamble) in the embodiment of the present invention. The known symbol is a symbol added to the OFDM signal intending synchronization, estimation of a channel position, and the like.

The pattern position measuring device 1 includes an effective symbol extraction section (pattern extraction element) 12, a first fast Fourier transform section 14, a second fast Fourier transform section 15, a complex conjugate conversion section 16, a mixer (spectrum product determining element) 20, an inverse fast Fourier transform section 22, a preliminary symbol position measuring section 24, a phase shift amount measuring section 26, a precision symbol position measuring section 28, and a symbol position measuring section 30.

The effective symbol extraction section (pattern extraction element) 12 extracts the known symbol as an effective symbol from the signal to be measured based on an approximate position of the known symbol (preamble) in the signal to be measured. For example, the known symbol is extracted starting from the approximate position of the known symbol (preamble) in the signal to be measured. It should be noted that the approximate position of the known symbol has been measured by the preliminary symbol position measuring section 24. If the approximate position of the known symbol has not been measured by the preliminary symbol position measuring section 24, the effective symbol extraction section 12 simply outputs the signal to be measured to the first fast Fourier transform section 14.

The first fast Fourier transform section 14 applies the fast Fourier transform (FFT) to the effective symbol extracted by the effective symbol extraction section 12, or the signal to be measured, and outputs the frequency spectrum thereof. The second fast Fourier transform section 15 applies the fast Fourier transform (FFT) to the known symbol, and outputs the frequency spectrum of the known symbol.

The complex conjugate conversion section 16 converts the frequency spectrum of the known symbol to the conjugate complex to be outputted.

The mixer (spectrum product determining element) 20 determines a product of the frequency spectrum of the effective symbol extracted by the effective symbol extraction section 12 and data based on the frequency spectrum of the known symbol. It should be noted that the data based on the frequency spectrum of the known symbol is a conversion result of the complex conjugate conversion section 16, for example. In this case, the mixer 20 determines a complex product of the frequency spectrum of the effective symbol extracted by the effective symbol extraction section 12 and the conversion result of the complex conjugate conversion section 16. Alternatively, if the effective symbol extraction section 12 simply outputs the signal to be measured to the first fast Fourier transform section 14, the mixer 20 determines a complex product of the frequency spectrum of the signal to be measured and the conversion result of the complex conjugate conversion section 16.

The inverse fast Fourier transform section 22 applies the inverse fast Fourier transform (IFFT: Inverse FFT) to the (complex) product determined by the mixer 20. It should be noted that the inverse fast Fourier transform section 22 operates only when the effective symbol extraction section 12 simply outputs the signal to be measured to the first fast Fourier transform section 14. Consequently, a correlation between the signal to be measured and the known symbol is determined.

The preliminary symbol position measuring section 24 measures the approximate position of the known symbol based on the output of the inverse fast Fourier transform section 22. It should be noted that the output of the inverse fast Fourier transform section 22 is based on the complex product of the frequency spectrum of the signal to be measured and the data based on the frequency spectrum of the known symbol. Thus, the preliminary symbol position measuring section 24 measures the approximate position of the known symbol based on the complex product of the frequency spectrum of the signal to be measured and the data based on the frequency spectrum of the known symbol. Then, the preliminary symbol position measuring section 24 transmits an operation start instruction to the phase shift amount measuring section 26.

Figure 2:
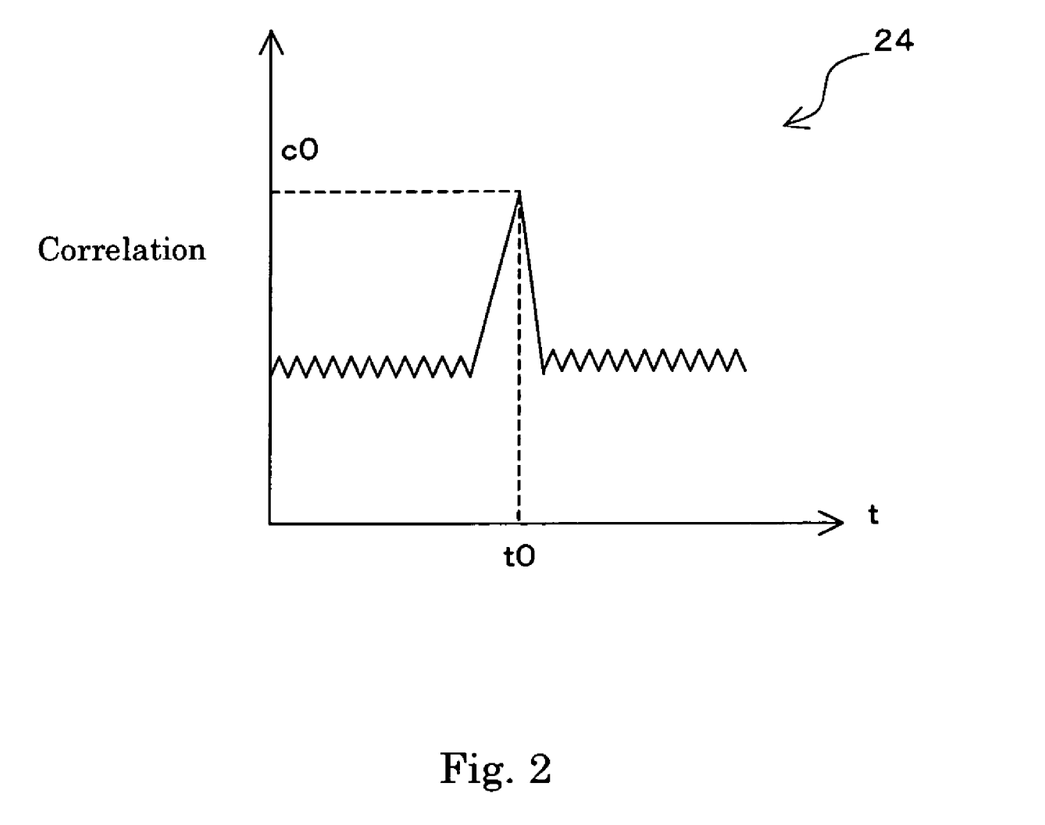
FIG. 2 is a chart showing a correlation between a signal to be measured and a known symbol.

A more detailed description will now be given of the measurement of the approximate position of the known symbol with reference to FIG. 2. It should be noted that the output of the inverse fast Fourier transform section 22 is the conversion result into the time domain of the complex product of the frequency spectrum of the signal to be measured and the data based on the frequency spectrum of the known symbol. This also represents the correlation between the signal to be measured and the known symbol. As shown in a chart in FIG. 2, the correlation takes the maximum value c0 at time t0. This time t0 is the approximate position of the known symbol in the signal to be measured.

However, it is necessary for the application of the fast Fourier transform to digitally represent the signal. Thus, the position of the known symbol cannot be measured by the preliminary symbol position measuring section 24 more precisely than a sampling interval for converting an analog signal to a digital signal. Therefore, only the "approximate" position of the known symbol can be measured.

The phase shift amount measuring section 26 measures the phase shift amount of the product determined by the mixer 20 on reception of the operation start instruction from the preliminary symbol position measuring section 24. Since the phase shift amount measuring section 26 starts the operation after the measurement of the position of the known symbol by the preliminary symbol position measuring section 24, the product determined by the mixer 20 is the product of the frequency spectrum of the effective symbol extracted by the effective symbol extraction section 12 and the data based on the frequency spectrum of the known symbol.

A description will now be given of the phase shift amount measured by the phase shift amount measuring section 26. In the OFDM signal, data is carried with respect to the frequency axis. For example, if data corresponding to a kth sub carrier frequency is denoted as dk, an effective symbol portion s(t) of the OFDM signal is represented as:

$$s(t) = \sum_{k=0}^{N-1} dk \cdot e^{jk\Delta wt}$$ [Equation 1]

It should be noted that $\Delta w$ denotes the interval of the subcarrier frequencies, and the N is the number of subcarriers. This equation is identical to a result of application of the IFFT (Inverse FFT: Inverse Fast Fourier Transform) to the data dk. Thus, if the FFT is applied to s(t), there is obtained a result:

$$S(k)=dk, k=0,1,\ldots,N-1$$

This is the output of the second fast Fourier transform section 15.

Consideration will now be given to a case where there is a time difference $\tau$, which is less than the sampling interval, between the effective symbol extracted by the effective symbol extraction section 12 and the known symbol prepared in advance (s'(t)=s(t+$\tau$)). If the FFT is applied to the effective symbol portion s'(t), there is obtained a result:

$$S'(k)=dk \cdot e^{jk\Delta w\tau}, k=0,1,\ldots,N-1$$

This is the output of the first fast Fourier transform section 14.

This is a product of S(k) and $e^{jk\Delta w\tau}$.

A product Y(k) of the result of the application of the FFT to the effective symbol extracted by the effective symbol extraction section 12 (S'(k)), and the conjugate complex of the result of the application of the FFT to the known symbol prepared in advance (S*(k)) is represented as:

$$Y(k) = S'(k)S^*(k)$$
$$= dk \cdot e^{jk\Delta w\tau} dk^*$$

-continued $$= |dk|^2 \cdot e^{jk\Delta w\tau}, k = 0, 1, \ldots, N-1$$

This is the product determined by the mixer 20. The phase shift amount $\Delta\theta$ of Y(k) is represented as: $\Delta\theta = \Delta w\tau$.

The precision symbol position measuring section 28 measures the difference ($\tau$) between the position of the known symbol and the approximate position based on the phase shift amount $\Delta\theta$ measured by the phase shift amount measuring section 26. Namely, since $\Delta\theta = \Delta w\tau$, $\tau = \Delta\theta/\Delta w$.

The symbol position measuring section 30 measures the position of the known symbol in the signal to be measured ($=t0+\tau$) based on the approximate position of the known symbol (t0) measure by the preliminary symbol position measuring section 24, and the difference ($\tau$) measured by the precision symbol position measuring section 28.

Figure 3:
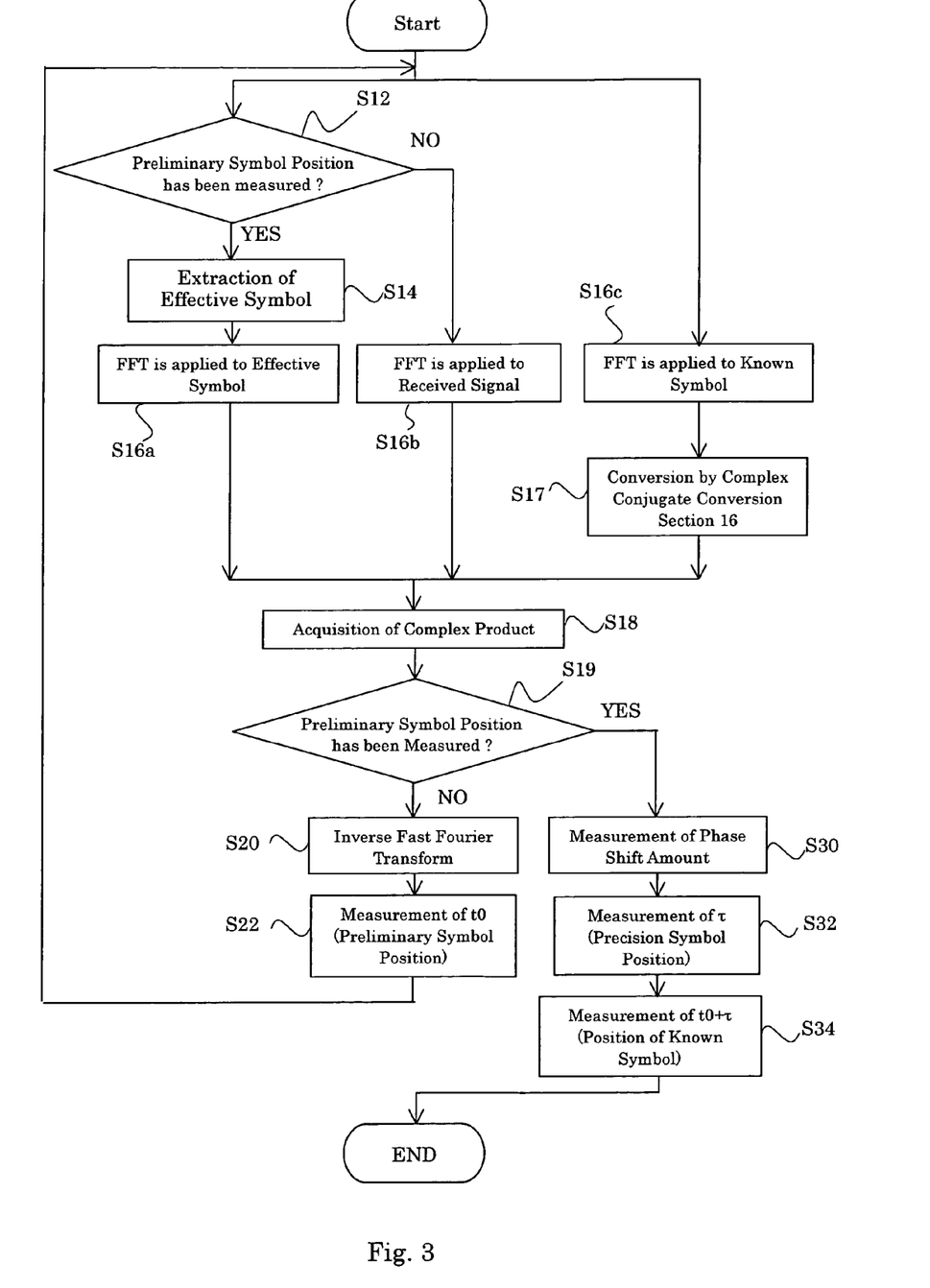
FIG. 3 is a flowchart showing an operation of the embodiment of the present invention.

A description will now be given of the operation of the embodiment of the present invention with reference to a flow-chart in FIG. 3.

First, the effective symbol extraction section 12 receives the signal to be measured. Then, the effective symbol extraction section 12 determines whether the preliminary symbol position, namely the approximate position of the known symbol t0 has been measured by the preliminary symbol position measuring section 24 (S12). Initially, the preliminary symbol position t0 has not been measured ("NO" in the step S12). Thus, the effective symbol extraction section 12 simply outputs the signal to be measured to the first fast Fourier transform section 14. Then, the fast Fourier transform is applied to the signal to be measured by the first fast Fourier transform section 14 (S16b).

In parallel with the fast Fourier transform of the signal to be measured, the fast Fourier transform is applied to the known symbol (preamble) by the second fast Fourier transform section 15, and consequently the frequency spectrum of the known symbol is determined (S16c). Then, the frequency spectrum of the known symbol is converted to the conjugate complex by the complex conjugate conversion section 16 (S17).

Then, the mixer 20 determines the complex product of the frequency spectrum of the signal to be measured and the conversion result by the complex conjugate conversion section 16 (S18). Since the preliminary symbol position t0 has not been measured ("NO" in a step S19), the phase shift amount measuring section 26 does not operate, and the inverse fast Fourier transform section 22 applies the inverse fast Fourier transform to the (complex) product determined by the mixer 20 (S20). Based on the output of the inverse fast Fourier transform section 22, the preliminary symbol position measuring section 24 measures the approximate position of the known symbol (preliminary symbol position) t0 (S22). On this occasion, the operation start instruction is transmitted to the phase shift amount measuring section 26.

After the measurement of the preliminary symbol position t0, the effective symbol extraction section 12 further receives the signal to be measured. On this occasion, the effective symbol extraction section 12 determines whether the preliminary symbol position t0 has been measured by the preliminary symbol position measuring section 24 (S12). Since the preliminary symbol position t0 has been measured ("YES" in the S12), the effective symbol extraction section 12 extracts the known symbol as the effective symbol from the signal to be measured based on the preliminary symbol position t0 (S14). For example, the effective symbol extraction section 12 starts extracting the known symbol from the preliminary symbol position t0. Then, the fast Fourier transform is applied to the effective symbol by the first fast Fourier transform section 14 (S16a).

In parallel with the fast Fourier transform of the effective symbol, the fast Fourier transform is applied to the known symbol (preamble) by the second fast Fourier transform section 15, and consequently the frequency spectrum of the known symbol is determined (S16c). Then, the frequency spectrum of the known symbol is converted to the conjugate complex by the complex conjugate conversion section 16 (S17).

Then, the mixer 20 determines the complex product of the frequency spectrum of the effective symbol and the conversion result by the complex conjugate conversion section 16 (S18). Since the preliminary symbol position t0 has been measured ("YES" in the S19), the phase shift amount measuring section 26 has started the operation, and measures the phase shift amount $\Delta\theta$ of the product determined by the mixer 20 (S30). The precision symbol position measuring section 28 measures the precision symbol position, namely the difference ($\tau$) between the known symbol position and the approximate position based on the phase shift amount $\Delta\theta$ measured by the phase shift amount measuring section 26 (S32). Finally, the symbol position measuring section 30 measures the position of the known symbol in the signal to be measured ($=t0+\tau$) based on the preliminary symbol position (t0) measured by the preliminary symbol position measuring section 24, and the precision symbol position ($\tau$) (S34).

According to the embodiment of the present invention, the preliminary symbol position measuring section 24 measures the time t0 as the approximate position of the known symbol (preliminary symbol position) when the maximum value c0 is reached by the conversion result into the time domain of the complex product of the frequency spectrum of the signal to be measured and the data based on the frequency spectrum of the known symbol (correlation of the signal to be measured and the known symbol).

However, the position of the known symbol cannot be measured more precisely than the sampling interval at which the signal to be measured or the like is converted to the frequency spectrum.

Therefore, the mixer 20 determines the product of the frequency spectrum of the effective symbol extracted by the effective symbol extraction section 12 and the data based on the frequency spectrum of the known symbol. Further, the phase shit amount measuring section 26 measures the phase shift amount $\Delta\theta$ of this product. The precision symbol position measuring section 28 measures the difference $\tau$ (precision symbol position) between the position of the known symbol and the approximate position based on $\Delta\theta$. As a result, the symbol position measuring section 30 can measures the position of the known symbol ($=t0+\tau$) in the signal to be measured.

Namely, since the phase shift amount $\Delta\theta$ itself precisely indicates the position of the known symbol in the signal to be measured, it is possible to precisely measure the position of the known symbol.

The following variations can be conceivable for the embodiment of the present invention.

First Variation

A description will now be given of a first variation with reference to FIG. 4. In the embodiment of the present invention, the effective symbol extraction section 12 extracts the known symbol starting from the preliminary symbol position t0. However, the error with respect to the true symbol position may be more than the sampling interval in the measurement of the preliminary symbol position t0.

Figure 4:
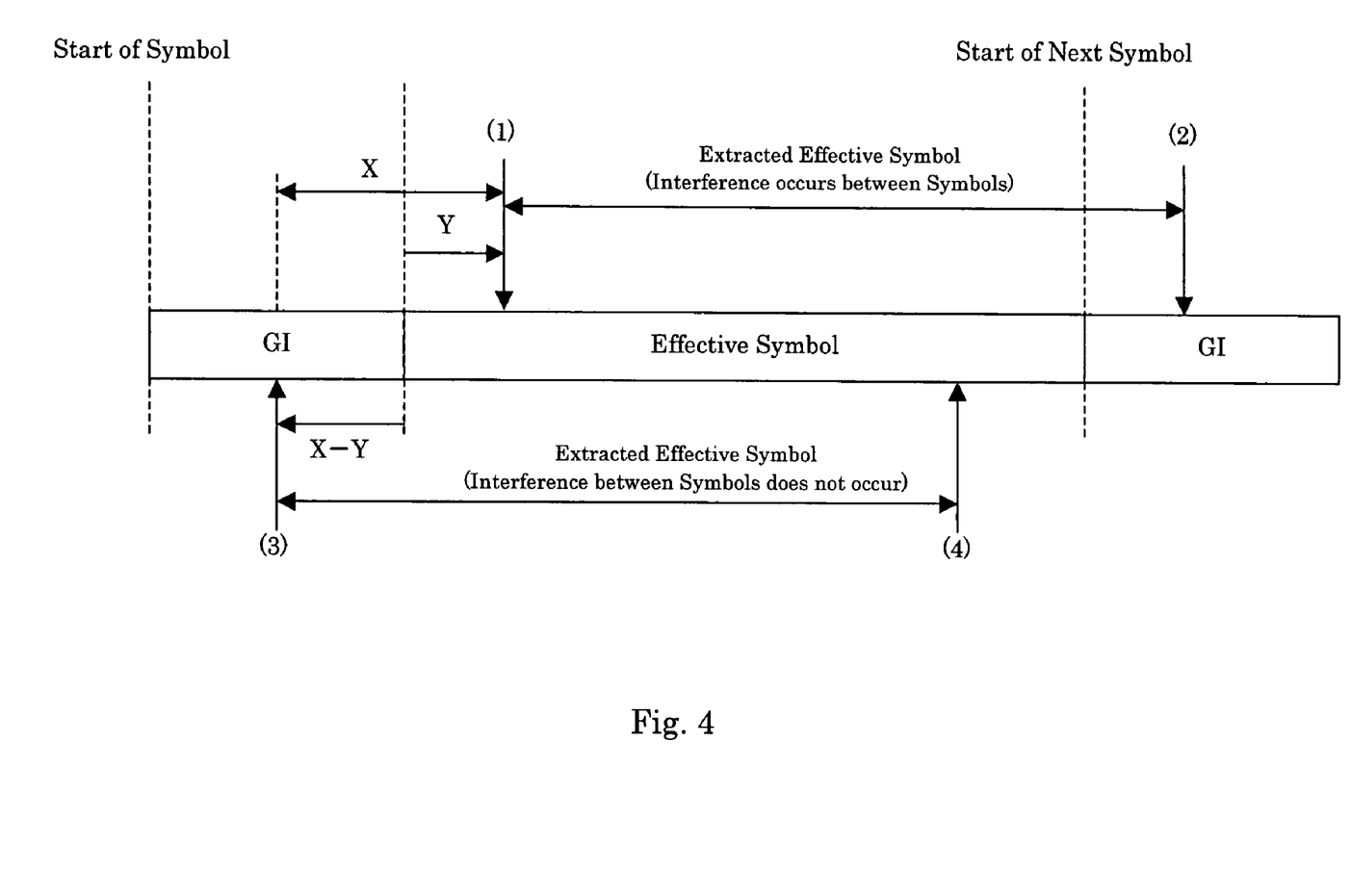
FIG. 4 shows a relationship between a symbol and an extraction start (end) position.

For example, there is considered a case where the symbol includes a GI (Guard Interval) and the effective symbol as shown in FIG. 4. It should be noted that the GI (Guard Interval) is a partial copy of the effective symbol, and is positioned prior to the effective symbol. If an error Y between the preliminary symbol position t0 and the true symbol position is equal to or more than the sampling interval, the position of starting the extraction is indicated as (1). If the extraction starts from (1), the extraction ends at a position indicated as (2), and the extracted effective symbol includes the next symbol. Consequently, interference occurs between the symbols, and the position of the known symbol is not correctly measured.

To accommodate the above problem, the extraction start position is displaced by a predetermined distance X as shown in FIG. 4. On this occasion, X>Y. As a result, the extraction start position (3) is placed within the GI (Guard Interval). If the extraction starts from (3), the extraction end position changes to (4), and the extracted effective symbol does not include the next symbol. As a result, the interference between symbols does not occur. Thus, the known symbol position can be correctly measured. It should be noted that the known symbol supplied to the second fast Fourier transform section 15 is also displaced by the predetermined distance X.

Second Variation

If an initial phase of the signal to be measured is θ, the signal to be measured is represented as:

$$s(t) = \sum_{k=0}^{N-1} dk \cdot e^{j(k\Delta w t + \theta)}$$ [Equation 2]

On this occasion, the product determined by the mixer 20, which is the product of the frequency spectrum of the effective symbol extracted by the effective symbol extraction section 12 and the data based on the frequency spectrum of the known symbol, is represented as:

$$Y(k) = |dk|^2 \cdot e^{j(k\Delta w \tau + \theta)}$$

Accordingly, an initial value of the phase shift amount Δθ measured by the phase shift amount measuring section 26 is also θ. On this occasion, the phase shift amount measuring section 26 is also caused to measure the initial value of the phase shift amount Δθ. Then, the initial phase of the signal to be measured can also be determined. As a result, the true position of the demodulated symbol can be acquired.

It should be noted that, in the above embodiment, on a computer including a CPU, a hard disk, and media (such as a floppy disk and a CD-ROM) reading apparatus, the media reading apparatus may be caused to read a medium recording a program realizing the above respective sections, and the program may be installed on the hard disk. The pattern position measuring device 1 may be realized in this way.

According to the present invention, the pattern extraction element extracts the predetermined pattern as the effective pattern from the signal to be measured based on the approximate position of the predetermined pattern. The spectrum product determining element determines the product of the frequency spectrum of the effective pattern and the data based on the frequency spectrum of the predetermined pattern. The phase shift amount measuring element measures the phase shift amount of the product determined by the spectrum product determining element. The precision pattern position measuring element measures the difference between the position and the approximate position of the predetermined pattern based on the phase shift amount.

The phase shift amount itself precisely indicates the position of the predetermined pattern in the signal to be measured, and the position of the predetermined pattern is thus precisely measured.

The invention claimed is:

1. A pattern position measuring device that measures a position of a predetermined pattern in a signal to be measured, comprising:
   a pattern extraction element that extracts the predetermined pattern as an effective pattern from the signal to be measured based on an approximate position of the predetermined pattern;
   a spectrum product determining element that determines a product of a frequency spectrum of the effective pattern and data based on a frequency spectrum of the predetermined pattern;
   a phase shift amount measuring element that measures a phase shift amount of the product determined by said spectrum product determining element;
   a precision pattern position measuring element that measures a difference between the position of the predetermined pattern and the approximate position of the predetermined pattern based on the phase shift amount;
   a complex conjugate conversion element that converts the frequency spectrum of the predetermined pattern to a conjugate complex;
   a first fast Fourier transform element that applies fast Fourier transform to the effective pattern so as to output the frequency spectrum of the effective pattern; and
   a second fast Fourier transform element that applies fast Fourier transform to the predetermined pattern so as to output the frequency spectrum of the predetermined pattern, wherein:
   said spectrum product determining element determines a complex product of the frequency spectrum of the effective pattern extracted by said pattern extraction element and a conversion result of said complex conjugate conversion element;
   the signal to be measured has a guard interval positioned prior to the predetermined pattern; and
   said pattern extraction element starts the extraction of the predetermined pattern from the signal to be measured within the guard interval.

2. The pattern position measuring device according to claim 1,
   wherein a position at which said pattern extraction element starts the extraction of the predetermined pattern from the signal to be measured is moved by a predetermined distance from the approximate position; and
   a start position of the predetermined pattern is also moved by the predetermined distance.

3. A pattern position measuring method that measures a position of a predetermined pattern in a signal to be measured, comprising:
   a pattern extraction step of extracting the predetermined pattern as an effective pattern from the signal to be measured based on an approximate position of the predetermined pattern;
   a spectrum product determining step of determining a product of a frequency spectrum of the effective pattern and data based on a frequency spectrum of the predetermined pattern;
   a phase shift amount measuring step of measuring a phase shift amount of the product determined by said spectrum product determining step;

a precision pattern position measuring step of measuring a difference between the position of the predetermined pattern and the approximate position of the predetermined pattern based on the phase shift amount;

a complex conjugate conversion step of converting the frequency spectrum of the predetermined pattern to a conjugate complex;

a first fast Fourier transform step of applying fast Fourier transform to the effective pattern so as to output the frequency spectrum of the effective pattern; and a second fast Fourier transform step of applying fast Fourier transform to the predetermined pattern so as to output the frequency spectrum of the predetermined pattern, wherein:

said spectrum product determining step determines a complex product of the frequency spectrum of the effective pattern extracted by said pattern extraction step and a conversion result of said complex conjugate conversion step;

the signal to be measured has a guard interval positioned prior to the predetermined pattern; and said pattern extraction step starts the extraction of the predetermined pattern from the signal to be measured within the guard interval.

4. A computer-readable medium having a program of instructions for execution by the computer to perform a pattern position measuring process that measures a position of a predetermined pattern in a signal to be measured, said pattern position measuring process comprising:

a pattern extraction step of extracting the predetermined pattern as an effective pattern from the signal to be measured based on an approximate position of the predetermined pattern;

a spectrum product determining step of determining a product of a frequency spectrum of the effective pattern and data based on a frequency spectrum of the predetermined pattern;

a phase shift amount measuring step of measuring a phase shift amount of the product determined by said spectrum product determining step;

a precision pattern position measuring step of measuring a difference between the position of the predetermined pattern and the approximate position of the predetermined pattern based on the phase shift amount;

a complex conjugate conversion step of converting the frequency spectrum of the predetermined pattern to a conjugate complex;

a first fast Fourier transform step of applying fast Fourier transform to the effective pattern so as to output the frequency spectrum of the effective pattern; and a second fast Fourier transform step of applying fast Fourier transform to the predetermined pattern so as to output the frequency spectrum of the predetermined pattern, wherein:

said spectrum product determining step determines a complex product of the frequency spectrum of the effective pattern extracted by said pattern extraction step and a conversion result of said complex conjugate conversion step;

the signal to be measured has a guard interval positioned prior to the predetermined pattern; and said pattern extraction step starts the extraction of the predetermined pattern from the signal to be measured within the guard interval.

* * * * *